(12) United States Patent
Blavius et al.

(10) Patent No.: US 11,996,207 B2
(45) Date of Patent: May 28, 2024

(54) NUCLEAR FUEL ASSEMBLY FOR A BOILING WATER REACTOR WITH REDUNDANT LOAD CHAIN

(71) Applicant: FRAMATOME, Courbevoie (FR)

(72) Inventors: Dirk Blavius, Erlangen (DE); Erhard Friedrich, Eckental (DE); Jens Schaefer, Erlangen (DE); Markus Singer, Ammerthal (DE); Sven Finzel, Forchheim (DE); Szilard Kovacs, Erlangen (DE)

(73) Assignee: FRAMATOME, Courbevoie (FR)

( * ) Notice: Subject to any disclaimer, the term of this patent is extended or adjusted under 35 U.S.C. 154(b) by 236 days.

(21) Appl. No.: 17/471,290

(22) Filed: Sep. 10, 2021

(65) Prior Publication Data
US 2022/0084695 A1    Mar. 17, 2022

(30) Foreign Application Priority Data
Sep. 14, 2020 (EP) ..................... 20306026

(51) Int. Cl.
*G21C 3/33*   (2006.01)
*G21C 3/32*   (2006.01)
*G21C 3/322*  (2006.01)
*G21C 3/328*  (2006.01)

(52) U.S. Cl.
CPC ............. *G21C 3/33* (2013.01); *G21C 3/3206* (2013.01); *G21C 3/322* (2013.01); *G21C 3/328* (2013.01); *G21C 3/3315* (2013.01)

(58) Field of Classification Search
CPC .......... G21C 3/33; G21C 3/332; G21C 3/322; G21C 3/3206; G21C 3/328; G21C 3/3305; G21C 3/3315
See application file for complete search history.

(56) References Cited

U.S. PATENT DOCUMENTS

| | | |
|---|---|---|
| 3,953,287 A | 4/1976 | Long et al. |
| 3,971,575 A | 7/1976 | Lesham et al. |
| 4,064,004 A | 12/1977 | Long et al. |
| 4,219,386 A * | 8/1980 | Osborne ................ G21C 3/334 411/102 |
| 4,526,744 A | 7/1985 | Borrman et al. |

(Continued)

OTHER PUBLICATIONS

Corresponding Search Report for EP 20306026.

*Primary Examiner* — Sharon M Davis
(74) *Attorney, Agent, or Firm* — Davidson, Davidson & Kappel, LLC

(57) ABSTRACT

A nuclear fuel assembly for a boiling water reactor extends along a fuel assembly axis and includes a base including a lower tie plate, a head including an upper tie plate and a lift handle, a bundle of fuel rods extending axially between the lower tie plate and the upper tie plate, and a water channel extending within the bundle of fuel rods with axially connecting the base to the head such that the load of the base is transferred to the head via the water channel. The fuel assembly further comprises a tie rod extending between the base and the head. The tie rod is axially fixed to the base and connected to the head via a connection assembly comprising a stopping member configured to abut an abutting surface of the head for limiting a downward movement of the base relative to the head during lifting of the fuel assembly, in case of a breakage of the water channel.

24 Claims, 5 Drawing Sheets

(56) References Cited

U.S. PATENT DOCUMENTS

| | | | | |
|---|---|---|---|---|
| 5,339,342 A | * | 8/1994 | Meier | G21C 3/324 |
| | | | | 376/303 |
| 5,646,973 A | | 7/1997 | Proebstle | |
| 5,748,695 A | * | 5/1998 | Dunlap | G21C 3/3315 |
| | | | | 376/444 |
| 5,896,436 A | * | 4/1999 | Gronlund | G21C 3/334 |
| | | | | 376/440 |
| 2004/0109522 A1 | * | 6/2004 | Smith | G21C 3/3315 |
| | | | | 376/261 |

* cited by examiner

NUCLEAR FUEL ASSEMBLY FOR A BOILING WATER REACTOR WITH REDUNDANT LOAD CHAIN

The present disclosure relates to a nuclear fuel assembly for a Boiling Water Reactor (BWR).

BACKGROUND

A reactor core of a BWR is formed of a plurality of fuel assemblies. Each fuel assembly is elongated along a fuel assembly axis. The fuel assemblies of the reactor core are placed side-by-side with their fuel assembly axis being substantially vertical. Each fuel assembly of the reactor core is loaded into the reactor core or unloaded from the reactor core by lifting the fuel assembly.

A fuel assembly for a BWR generally comprises a base including a lower tie plate, a head including an upper tie plate and a lifting handle, the base and the head being spaced one from the other along the fuel assembly axis, a bundle of fuel rods, the fuel rods extending axially between the lower tie plate and the upper tie plate and each fuel rod containing fissile material, at least one tubular water channel (or water rod) arranged inside the bundle of fuel rods with connecting the lower tie plate to the upper tie plate and a tubular fuel channel encasing the bundle of fuel rods and each water channel located within the bundle of fuel rods. The fuel rods are e.g. supported axially and transversely by spacer grids which are distributed along the water channel(s) and connected to the water channel(s).

The lifting handle is configured for lifting the fuel assembly, e.g. for loading the fuel assembly into the reactor core or unloading the fuel assembly from the reactor core.

The lifting handle is connected to the upper tie plate, the lower tie plate being connected to the upper tie plate via the water channel(s), such that fuel assembly can be lifted as a unit, the load of the fuel channel being transferred via the water channel(s) forming a main load chain However, a water channel may break such that the lower tie plate is no longer connected to the upper tie plate and the lifting handle and may fall and damage, e.g. to other fuel assemblies, or generate debris that may potentially damage other fuel assemblies or the BWR.

SUMMARY

One of the aims of the present disclosure is to provide a fuel assembly that is more reliable, in particular when lifting the fuel assembly.

A fuel assembly for a boiling water reactor is provided, the fuel assembly extending along a fuel assembly axis and comprising a base including a lower tie plate, a head including an upper tie plate and a lift handle, a bundle of fuel rods extending axially between the lower tie plate and the upper tie plate, and a water channel extending within the bundle of fuel rods with axially connecting the base to the head such that the load of the base is transferred to the head via the water channel, wherein the fuel assembly further comprises a tie rod extending between the base and the head, the tie rod being axially fixed to the base and connected to the head via a connection assembly comprising a stopping member configured to abut an abutting surface of the head for limiting a downward movement of the base relative to the head during lifting of the fuel assembly, in case of a breakage of the water channel.

The provision of one or several tie rods allows to form an auxiliary load chain (or redundant load chain) that is operative to connect the lower tie plate to the upper tie plate in case of a breakage of the main load chain formed by one or several water channel(s).

Preferably, the stopping member is active only in case of breakage of the water channel. In particular, the (inactive) stopping member is spaced from the corresponding abutting surface when the water channel is operative to connect the lower tie plate to the upper tie plate, and the (active) stopping member abuts against the corresponding abutting surface for stopping a downward movement of tie rod relative to the abutting surface when lifting the fuel assembly when the water channel is inoperative to axially connect the lower tie plate to the upper tie plate, the water channel being e.g. broken. The auxiliary load chain is thus active only when the main load chain is inoperative.

In specific embodiments, the fuel assembly comprises one or several of the following optional features, taken individually or according to any technically feasible combination:
  the connection assembly is configured such that load of the base is transferred to the head via the tie rod only once the water channel has broken;
  the connection assembly is configured to allow axial sliding of the tie rod relative to the head when the water channel is operational such that the load of the base is transferred to the head via the water channel and to axially stop the tie rod relative to the head once the water channel has broken such that the load of the base is transferred to the head via the tie rod;
  the stopping member is fixedly attached to an upper end of the tie rod;
  the connection assembly is configured for the stopping member to wedge between the abutting surface and the tie rod in case of a downward displacement of the tie rod relative to the head;
  the stopping member is fitted onto the tie rod with allowing the tie rod to slide relative to the stopping member when the stopping member is not wedged;
  an outer surface of the stopping member that is configured for contacting the abutting surface is frustoconical and/or tapers downwardly;
  the abutting surface is frustoconical and/or tapers downwardly;
  the stopping member is ring shaped and is fitted onto the tie rod;
  the stopping member is slotted for allowing radial contraction of the stopping member onto the tie rod;
  the connection assembly comprise a return member for urging the stopping member away from the abutting surface;
  the stopping member is mounted captive onto the head;
  the connection assembly comprises a retaining member mounted onto the head for retaining the stopping member captive in a cavity of the head;
  the retaining member is screwed onto the head;
  the retaining member is provided with at least one protrusion configured for driving the stopping member in rotation relative to the head jointly with the retaining member upon unscrewing the retaining member.

BRIEF DESCRIPTION OF THE DRAWINGS

The present disclosure and its advantages will be better understood upon reading the following description, given solely by way of example and with reference to the appended drawings, in which.

DETAILED DESCRIPTION

Figure 1:
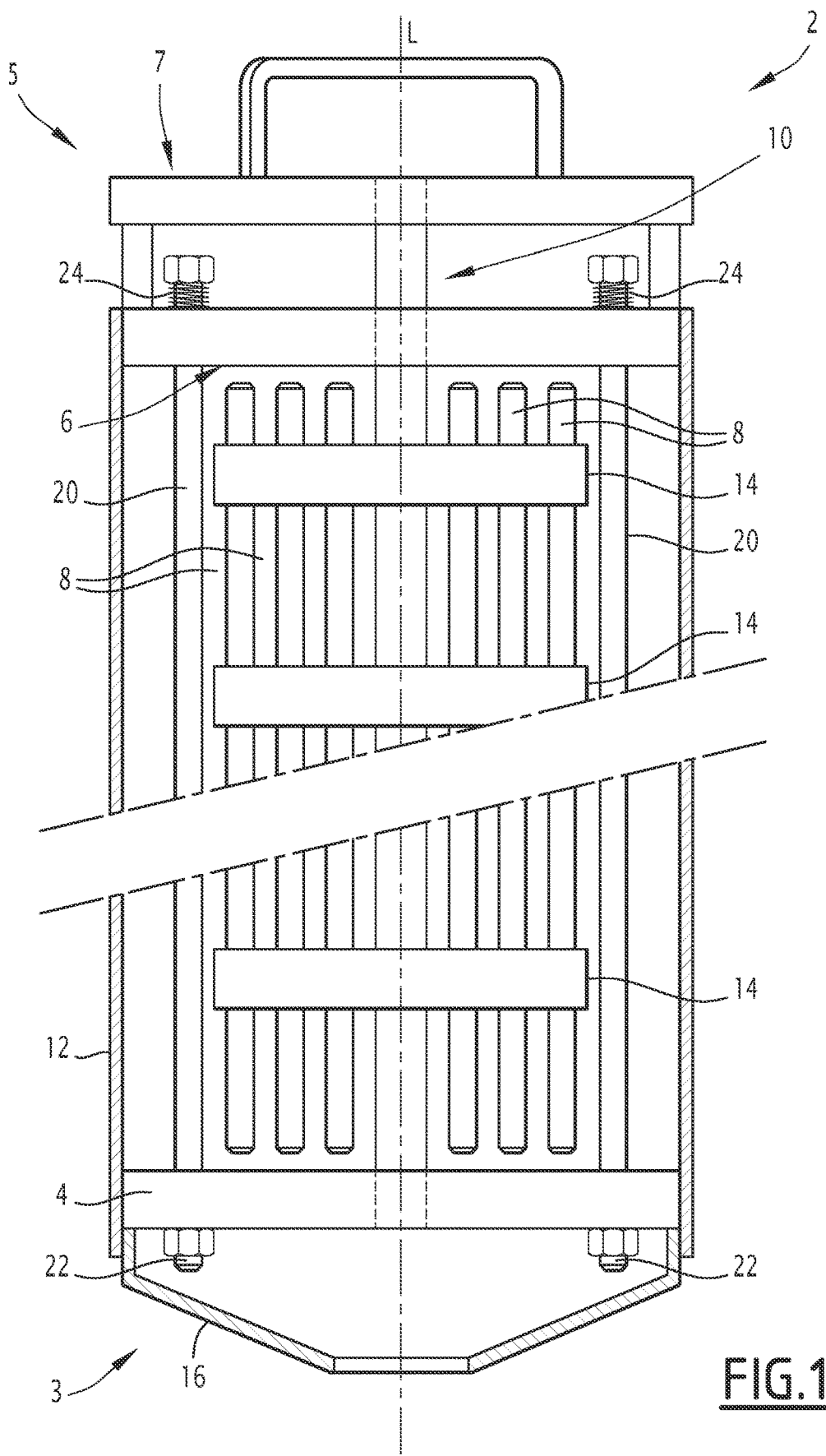
FIG. 1 is a schematic cross-section view illustrating a nuclear fuel assembly for a boiling water reactor.

FIG. 1 shows a nuclear fuel assembly 2 for a boiling water reactor (BWR). The fuel assembly 2 is elongated along a fuel assembly axis L.

The fuel assembly 2 is intended to be placed with the fuel assembly axis L oriented vertically in a reactor core of a nuclear reactor where coolant flows upwardly during operation. In the following, the terms "lower" and "upper" refer to the position of the fuel assembly 2 in the reactor.

The fuel assembly 2 comprises a base 3 comprising a lower tie plate 4, a head 5 spaced axially from the base 3 and comprising an upper tie plate 6 and a lifting handle 7, a bundle of nuclear fuel rods 8 extending axially between the lower tie plate 4 and the upper tie plate 6, a tubular water channel 10 extending axially between the lower tie plate 4 and the upper tie plate 6 with being inserted within the bundle of fuel rods 8 and connecting the lower tie plate 4 to the upper tie plate 6, and a tubular fuel channel 12 extending axially between the lower tie plate 4 and the upper tie plate 6 with encasing the bundle of fuel rods 8.

The fuel rods 8 are maintained transversely in a spaced relationship with being arranged for example at the nodes of an imaginary lattice. In such case, the water channel 10 occupies for example one or several nodes of the imaginary lattice.

The fuel assembly 2 comprise for example a plurality of spacer grids 14 distributed along the longitudinal axis L, each spacer grid 14 maintaining the fuel rods 8 longitudinally and transversely.

Each spacer grid 14 is for example rigidly connected to the water rod 10. Each spacer grid 14 comprises for example fuel rod cells, each fuel rod 8 supported by the spacer grid 14 extending through a fuel rod cell.

Each fuel rod 8 is elongated axially. Each fuel rod 8 contains fissile material. Each fuel rod 8 comprises for example a tubular cladding filled with nuclear fuel pellets stacked inside the cladding, the ends of the cladding being closed by end plugs.

The base 3 optionally comprises a tubular transition piece 16 that is connected to the lower tie plate 4. The transition piece 16 is configured for channeling water from an inlet of the transition piece 16 towards the lower tie plate 4 such that the water can flow axially upwardly within the water channel 10 and within the fuel channel 12 along the fuel rods 8.

The lifting handle 7 is rigidly connected to the upper tie plate 6. The lifting handle 7 is configured for grabbing the fuel assembly 2 for lifting the fuel assembly 2.

Upon lifting the fuel assembly 2 via the handle 7, the load of the fuel assembly 2 is transmitted between the lower tie plate 4 and the upper tie plate 6 via the water channel 10 that axially connects the lower tie plate 4 to the upper tie plate 6.

The water channel 10 defines a main load chain between the lower tie plate 4 and the upper tie plate 6.

The fuel assembly 2 further comprises at least one tie rod 20 extending axially between the base 3 and the head 5, each tie rod 20 having a lower end 22 axially fixed to the base 3 and an upper end 24 axially connected to the head 5 via a connection assembly 26, such as to limit an axial downward movement of the base 3 relative to head 5.

Each tie rod 20 forms part of an auxiliary load chain that is configured for connecting the base 3 to the head 5 in case of failure of the water channel 10, in particular in case of breakage of the water channel 10.

Each tie rod 20 is distinct from each fuel rod 8. Each tie rod 20 is deprived of fissile material. Each tie rod 20 is for example located at a node of the imaginary lattice at the nods of which the fuel rods 8 and the water channel 10 are placed.

Each tie rod 20 is also distinct from each water channel 10.

The lower end 22 of each tie rod 20 is axially fixedly connected to the base 3. The lower end 22 of each tie rod 20 is for example fixedly connected to the lower tie plate 4.

As illustrated on FIG. 1, a lower end 22 of each tie rod 20 is axially fixedly connected to the lower tie plate 4 via at least one fixing nut 26. The fixing nut 26 is for example screwed onto the lower end 22 that is e.g. externally threaded.

The connection assembly 26 associated to each tie rod 20 is preferably configured for allowing an axial displacement of the upper end 24 of tie rod 20 relative to the head 5 on a limited stroke and for preventing axial displacement of the upper end 24 of the tie rod 20 relative to the head 5 further than the limited stroke.

The possible limited stroke of the upper end 24 of each tie rod 20 allows accommodating a differential thermal elongation between the tie rods 20 and the water channel 10.

The connection assembly 26 associated to each tie rod 20 connects for example the upper end 24 of said tie rod 20 to the upper tie plate 6 or to the lifting handle 7. In the following, the connection assembly 26 is described with referring in a general manner to the head 5 but may apply to the upper tie plate 6 or the lifting handle 7.

Figure 2:
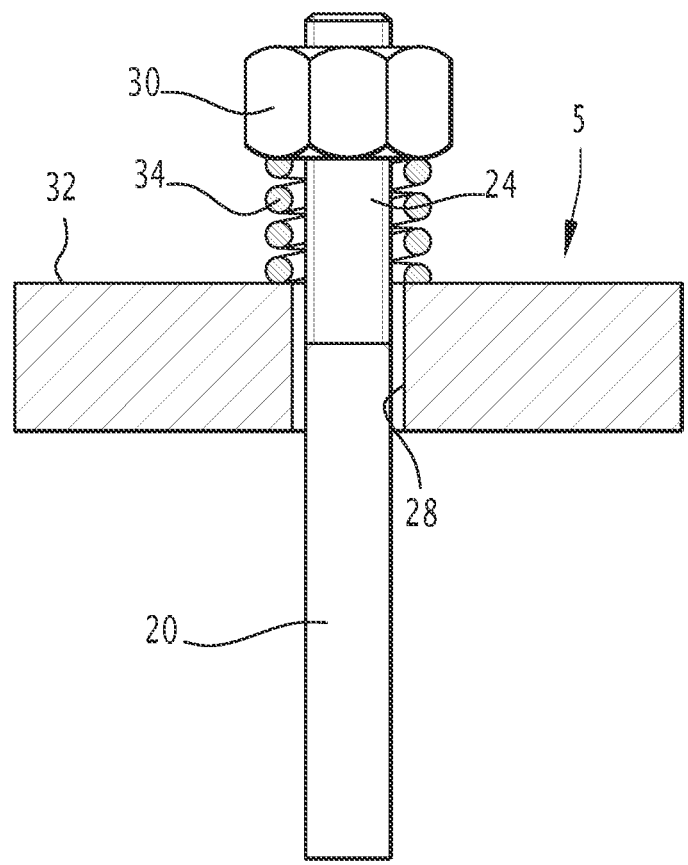
FIG. 2 is a schematic cross-section view of a connection assembly connecting a tie rod to an upper tie plate of a fuel assembly.

FIG. 2 schematically illustrates an example of a connection assembly 26 connecting an upper end 24 of a tie rod 20 to the head 5.

The tie rod 20 is slidably connected to the head 5. The tie rod 20 extends for example through a hole 28 of the head 5 with being slidably received in this hole 28. The hole 28 may be provided on the upper tie plate 6 or in the lifting handle 7.

The connection assembly 26 comprises a stopping member 30 that is axially fixedly attached to an upper end 24 of the tie rod 20, the stopping member 30 being configured to abut against an abutting surface 32 of the head 5 for limiting a downward movement of the upper end 24 of the tie rod 20 relative to the head 5.

The abutting surface 32 may be provided on the upper tie plate 6 or on the lifting handle 7.

The stopping member 30 is for example screwed to the upper end 26 of the tie rod 20.

In such case, the upper end 24 of the tie rod 20 is for example threaded. In one embodiment, the stopping member 30 is a nut and the upper end 32 is externally threaded.

The stopping member 30 is positioned axially along the tie rod 20 such as to allow the limited downward stroke of the stopping member 30 downwardly relative to the handle 5 before the stopping member 30 abuts the abutting surface 32 such as to prevent a further downward movement of the tie rod 20 (and the base 3) relative to the head 5.

As indicated above, the possible limited stroke of the stopping member 30 allows accommodating a differential thermal elongation between the tie rods 20 and the water channel 10.

Optionally, the connection assembly 26 comprises a return member 34 configured for urging the stopping member 30 away from the abutting surface 32, preferably in a permanent manner. In particular, the return member 34 is configured for pushing the stopping member 30 away from the abutting surface 32, preferably in a permanent manner.

The return member 34 is for example interposed axially between the stopping member 30 and the head 5 such as to oppose to a downward movement of the stopping member 30 relative to head 5 and push the stopping member 30 upwardly relative to the head 5.

The return member 34 is for example elastically deformable spring. In a particular embodiment, the return member 34 is a helical spring fitted onto the upper end 24 of the tie rod 20 with being interposed between the stopping member 30 and the head 5.

In operation, the base 3 is axially rigidly connected to the head 5 via the water channel 10. Each tie rods 20 is rigidly connected to the base 3 and is connected to the head 5 with an axial play via the associated connection assembly 26.

Upon lifting the fuel assembly 2, here via the lifting handle 7, the load of the base 3 is transferred to the head 5 via the water channel 10 which defines a main load chain.

In case of a breakage of the water channel 10, the load of the base 3 is no longer transferred to the head 5 via the water channel 10. Upon lifting the fuel assembly 2, here with using the lifting handle 7, the base 3 tends to move downward relative to the head 5.

In such case, the tie rods 20 limit a downward movement of the base 3 relative to the head 5. Each tie rod 20 slides downwardly relative to the head 5 until the stopping member 30 abuts the abutting surface 32. The load of the base 3 is then transferred to the head 5 via the tie rod 20.

Hence, although the water channel 10 is broken, the fuel assembly 2 can still be lifted with remaining unitary and with limiting the risk of parts falling down and/or the risk of generating debris in the nuclear reactor.

Each tie rod 20 forms an auxiliary load chain (or redundant load chain) that transfers load between the base 3 and the head 5 in case of failure or breakage of the main load chain defined by the water channel 10.

Figure 3:
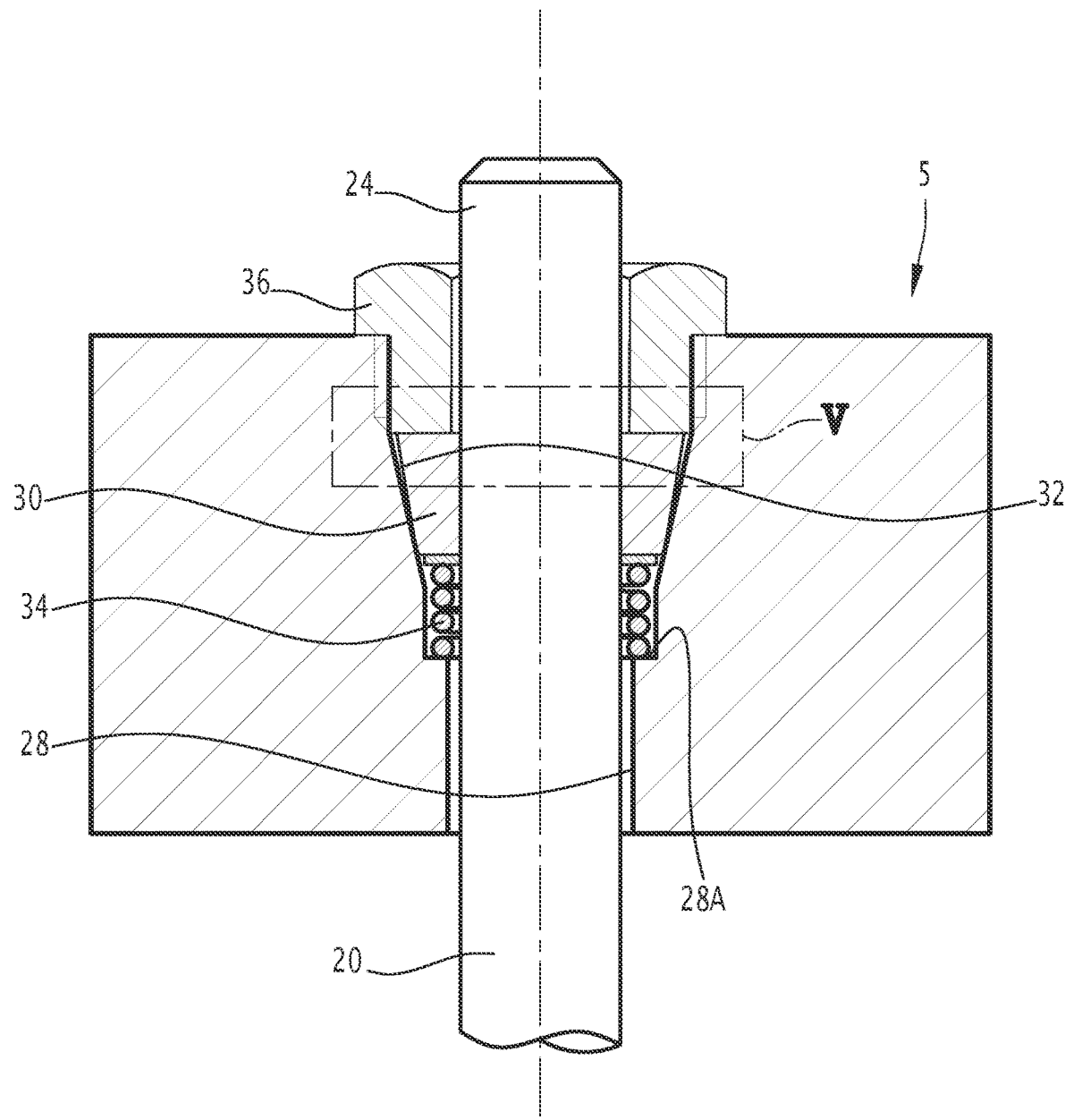
FIG. 3 is a schematic cross-section view of a connection assembly connecting a tie rod to an upper tie plate of a fuel assembly.

FIG. 3 schematically illustrates another example of a connection assembly 26 that differs from that of FIG. 2 in that it is configured for the stopping member 30 to wedge between the upper end 24 of the tie rod 20 and the abutting surface 32, in particular when the tie rod 20 is pulled downwardly relative to the head 5.

The stopping member 30 comprises for example an axially tapering outer surface 30A. The outer surface 30A tapers downwardly. The outer surface 30A is for example frustoconical.

The abutting surface 32 is for example tapering axially. In particular, the abutting surface 32 tapers downwardly. The abutting surface 32 is for example frustoconical.

The stopping member 30 is for example ring shaped and fitted onto the upper end 24 of the tie rod 20.

Advantageously, the stopping member 30 is slidably fitted onto the upper end 24 of the tie rod 20, the stopping member 30 being configured to slide along the upper end 24 of the tie rod 20 when the stopping member 30 is not wedged and to axially stop the upper end 24 of the tie rod 20 when the stopping member 30 is wedged between the upper end 24 of the tie rod 20 and the abutting surface 32.

This allows an axial movement of the upper end 24 of the tie rod 20 relative to the head 5, e.g. to accommodate for differential thermal elongation as explained above, when the stopping member 30 is not wedged.

In one example, the stopping member 30 is fitted onto the upper end 24 of the tie rod 20 with a friction fit. Hence, slow movement of the upper end 24 of the tie rod 20, such as a slow movement due to thermal expansion, will not wedge the stopping member 30 between the upper end 24 and the abutting surface 32, whereas a faster movement, such as provoke by pulling down the tie rod 20, will wedge the stopping member 30 between the upper end 24 and the abutting surface 32.

Figure 4:
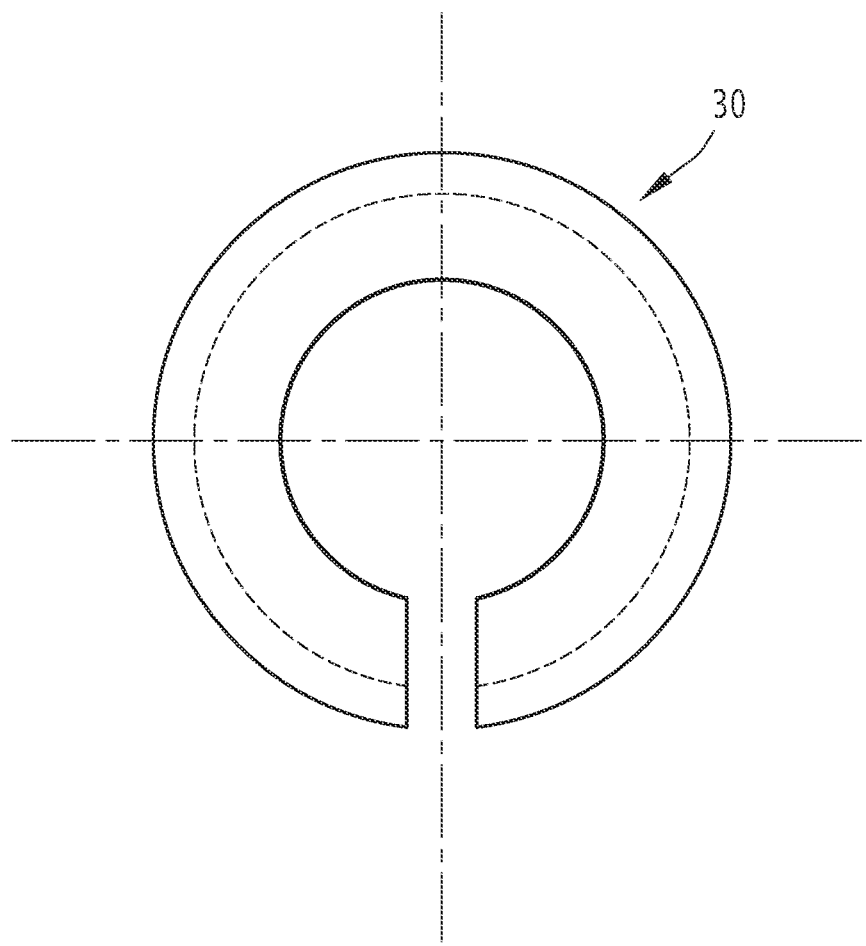
FIG. 4 is a top view of a slotted ring-shaped stopping member of the connection assembly of FIG. 3.

Preferably, as illustrated on FIG. 4, the ring shaped stopping member 30 is slotted such as to be radially compressible. This eases wedging of the stopping member 30 between the upper end 24 of the tie rod 20 and the abutting surface 32.

In one example, as illustrated on FIG. 3, the tie rod 20 extends through a hole 28 of the head 5, the abutting surface 32 being defined inside the hole 28.

The stopping member 30 is for example mounted captive on the head 5. The stopping member 30 is for example retained captive inside the hole 28. In particular, axial movement of the stopping member 30 is axially restricted relative to the head 5.

The connection assembly 26 comprises for example a retaining member 36 attached to the upper tie plate 6, the stopping member 30 being retained axially between the retaining member 36 and the abutting surface 32 such that the stopping member 30 is mounted captive on the head 5.

The retaining member 36 is for example ring shaped, with being externally threaded such as to be screwed onto the head 5, e.g. into an internally threaded section of the hole 28 and with having an orifice 38 allowing the tie rod 20 to extend slidably through the retaining member 36. The retaining member 36 does not interfere with the tie rod 20 that is free to slide axially relative to the retaining member 36.

Advantageously, the connection assembly 26 optionally comprises a return member 34 that is configured to bias the stopping member 30 away from the abutting surface 32.

The return member 34 is for example an elastically deformable spring, in particular an helical spring fitted onto the tie rod 20, axially between the stopping member 30 and an internal shoulder 40 of the hole 28, such as to push the stopping member 30 away from the abutting surface 32.

The return member 34 is helps maintaining the stopping member 30 in a position in which the stopping member 30 is not wedged between the tie rod 20 and the head 5 in normal operation (when the main load chain is operative).

During normal operation, a slight and/or slow movement of the tie rod 20 relative to the upper tie plate 6, e.g. due to thermal elongation of the tie rod 20, is not prevented by the stopping member 30.

In case of a failure (e.g. breakage) of the water channel 10, the tie rod 20 tends to be pulled downwards relative to the head 5. The tie rod 20 thus moves the stopping member 30 downwardly, e.g. by friction, and the stopping member 30 wedges between the tie rod 20 and the abutting surface 32, thus stopping the tie rod 20 relative to the head 5.

Once the stopping member 30 is wedged, the tie rod 20 is stopped axially relative to the head 5 and the tie rod 20 can transmit load from the base 3 to the head 5. Any increase in the load applied to the tie rod 20 wedged the stopping member 30 further.

During normal operation, when the return member 34 is provided, the return member 34 helps keeping the stopping member 30 not wedged, even though the tie rod 20 may slide relative to the head 5, e.g. due to differential thermal elongation.

In case of a failure (e.g. breakage) of the water channel 10, In case of a failure (e.g. breakage) of the water channel 10, the stopping member 30 is wedged between the tie rod 20 and the abutting surface 32 against action of the return member 34.

Once the stopping member 30 is wedged between the tie rod 20 and the head 5 and the fuel assembly 2 has been removed from the reactor core, the wedged stopping member 30 may prevent easy dismounting of the fuel assembly 2. The return member 34 also helps dismounting the fuel assembly 2 when the stopping member 30 is wedged.

Figure 5:
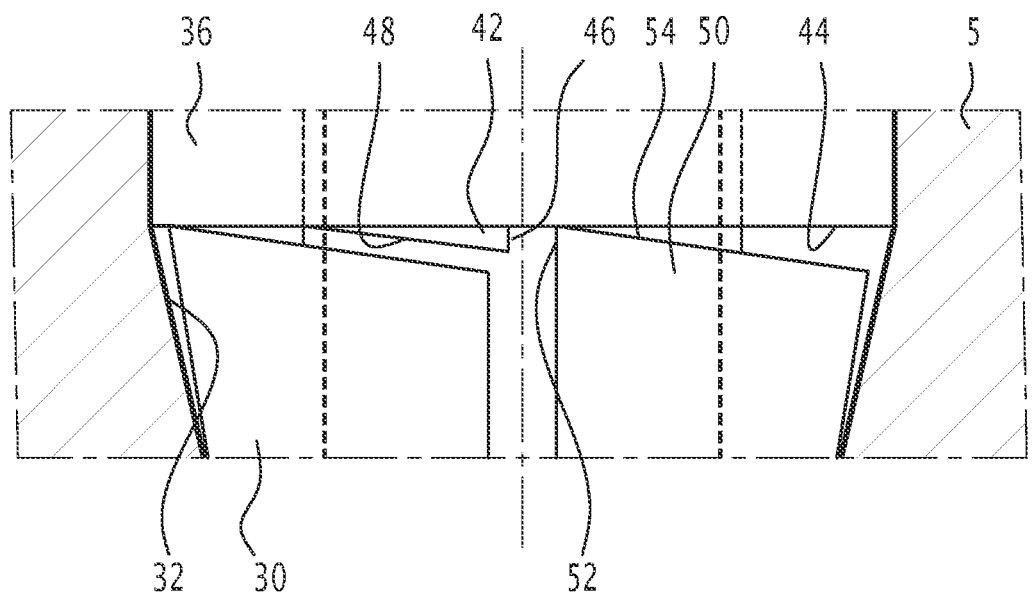
FIG. 5 is a schematic cross-section view of a connection assembly connecting a tie rod to an upper tie plate of a fuel assembly.

As illustrated on FIG. 5, optionally, the retaining member 36 comprises at least one protrusion 42 configured for interfering with the stopping member 30 upon rotating the retaining member 36 about the axis of the tie rod 20, in particular upon unscrewing the retaining member 36 from the head 5, such as to drive the stopping member 30 in rotation jointly with the retaining member 36. Thus can help releasing the wedged stopping member 30 upon dismounting the fuel assembly 2.

Each protrusion 42 is provided on a lower face 44 of the retaining member 36 facing the stopping member 30. In the illustrated example, the stopping member 20 is pushed axially by the return member 34 towards the lower face 44, thus promoting engagement of the stopping member 30 with the protrusion(s) 42.

Each protrusion 42 is configured for example has an abutting surface 46 configured to interfere with the stopping member 30 and to drive the stopping member 30 in rotation jointly with the retaining member 36 upon unscrewing the retaining member 36 from the head 5.

Preferably, each protrusion 42 has a sliding surface 48 configured for sliding onto the stopping member 30 without driving the stopping member 30 in rotation upon screwing the retaining member 34 onto the head 5.

Each protrusion 42 is thus configured for driving the stopping member 30 in rotation upon unscrewing the retaining member 36 and not driving the stopping member 30 in rotation upon screwing the retaining member 36.

If the stopping member 30 is slotted, each protrusion 40 may be configured for example to interfere with one of the two edges of the slot.

Alternatively or optionally, the stopping member 30 is also provided with at least one protrusion 50 onto a surface of the stopping member 30 facing the retaining member 36, each protrusion 50 of the stopping member being configured for cooperating with each protrusion 52 of the retaining member 36 for the retaining member 36 to drive the stopping member 30 in rotation upon unscrewing retaining member 36 from the head 5 and not driving the stopping member 30 in rotation upon screwing the retaining member 36 onto the head 5.

Each protrusion 50 of the stopping member 30 comprises for example an abutting surface 52 for abutting onto an abutting surface 46 of a protrusion 42 of the retaining member 36 when screwing the retaining member 34 and a sliding surface 54 for sliding onto a sliding surface 48 of a protrusion 42 of the retaining member 36 when unscrewing the retaining member 36.

Owing to the present disclosure, the fuel assembly 2 is provided with a main load chain defined by a water channel 10 and an auxiliary load chain formed of tie rods 20, the auxiliary load chain being not active in normal operation and becoming active upon failure of the main load chain, to prevent a downward movement of the base 3 relative to the head 5 upon lifting the fuel assembly 2 via the head 5.

The auxiliary load chain is formed of tie rod 20 extending between the base 3 and the head 5 with being fixedly attached to the base 3, in particular to the lower tie plate 4, and connected to the head 5 via a connection assembly 22 allowing with an axial play. The axial play allows accommodating differential thermal elongation between the tie rods 20 and the water channel 10 during normal operation, and an activation of the auxiliary load chain upon failure of the main load chain.

The connection assembly 22 comprising a stopping member 30 for abutting an abutting surface 32 is reliable. The axial play is easily adjustable. A wedging stopping member 30 allows a reliable string stopping of the tie rod 20 relative to the head 5.

The connection assembly 22 is arranged between the upper end 24 of the tie rod 20 and the head 5. More specifically it may be arranged between the upper end 24 of the tie rod 20 and the handle 7 of the head 5, in which case the hole 28 and/or abutting surface 32 is provided on the handle 7, or between the upper end 24 of the tie rod 20 and the upper tie plate 4 of the head 5, in which case the hole 28 and/or abutting surface 32 is provided on the upper tie plate 4.

The fuel assembly 2 has been described above with reference to one water channel 10, but the fuel assembly may of course comprises several water channels 10 forming together a main load chain for transferring the load of the base 3 to the head 5.

Similarly, one tie rod 20 and the corresponding connection assembly 22 have been described in detail, but the fuel assembly 2 may comprises several tie rods 22 and a respective connection assembly 22 associated to each tie rod 2, the consideration above applying to each tie rod 20 and each connection assembly 22.

What is claimed is:

1. A fuel assembly for a boiling water reactor, the fuel assembly extending along a fuel assembly axis and comprising:

a base including a lower tie plate;

a head including an upper tie plate and a lift handle;

a bundle of fuel rods extending axially between the lower tie plate and the upper tie plate; a water channel extending from the base to the head within the bundle of fuel rods and axially connecting the base to the head such that a load of the base is transferred to the head via the water channel; and a tie rod extending between the base and the head, the tie rod being axially fixed to the base and connected to the head via a connection assembly comprising a stopping member configured to abut an abutting surface of the head in a manner that limits a downward movement of the base relative to the head during lifting of the fuel assembly, in case of a breakage of the water channel;

wherein the water channel forms a main load chain and the tie rod forms an auxiliary load chain that transfers load between the base and the head in case of breakage of the main load chain defined by the water channel.

2. The fuel assembly as in claim 1, wherein the connection assembly is configured such that load of the base is transferred to the head via the tie rod only once the water channel has broken.

3. The fuel assembly as in claim 1, wherein the connection assembly is configured to allow axial sliding of the tie rod relative to the head when the water channel is operational such that the load of the base is transferred to the head via the water channel and to axially stop the tie rod relative to the head once the water channel has broken such that the load of the base is transferred to the head via the tie rod.

4. The fuel assembly as in claim 1, wherein the stopping member is fixedly attached to an upper end of the tie rod.

5. The fuel assembly as in any claim 1, wherein the connection assembly is configured for the stopping member to wedge between the abutting surface and the tie rod in case of a downward displacement of the tie rod relative to the head.

6. The fuel assembly as in claim 5, wherein the stopping member is fitted onto the tie rod to allow the tie rod to slide relative to the stopping member when the stopping member is not wedged.

7. The fuel assembly as in claim 1, wherein an outer surface of the stopping member that is configured for contacting the abutting surface is frustoconical and/or tapers downwardly.

8. The fuel assembly as in claim 1, wherein the abutting surface is frustoconical and/or tapers downwardly.

9. The fuel assembly as in claim 1, wherein the stopping member is ring shaped and is fitted onto the tie rod.

10. The fuel assembly as in claim 9, wherein the stopping member is slotted for allowing radial contraction of the stopping member onto the tie rod.

11. The fuel assembly as in claim 1, wherein the connection assembly comprises a return member for urging the stopping member away from the abutting surface.

12. The fuel assembly as in claim 11, wherein the return member is configured for pushing the stopping member away from the abutting surface in a permanent manner.

13. The fuel assembly as in claim 11, wherein the return member is an elastically deformable spring.

14. The fuel assembly as in claim 11, wherein the return member is a helical spring fitted onto an upper end of the tie rod and interposed between the stopping member and the head.

15. The fuel assembly as in claim 1, wherein the stopping member is mounted captive onto the head.

16. The fuel assembly as in claim 15, wherein the connection assembly comprises a retaining member mounted onto the head for retaining the stopping member captive in a cavity of the head.

17. The fuel assembly as in claim 16, wherein the retaining member is screwed onto the head.

18. The fuel assembly as in claim 17, wherein the retaining member is provided with at least one protrusion configured for driving the stopping member in rotation relative to the head jointly with the retaining member upon unscrewing the retaining member.

19. The fuel assembly as in claim 1, wherein each tie rod is distinct from each fuel rod.

20. The fuel assembly as in claim 1, wherein each tie rod is deprived of fissile material.

21. The fuel assembly as in claim 1, wherein each tie rod is distinct from each water channel.

22. The fuel assembly as in claim 1, wherein the connection assembly associated to each tie rod is configured for allowing an axial displacement of an upper end of the tie rod relative to the head on a limited stroke and for preventing axial displacement of the upper end of the tie rod relative to the head further than the limited stroke.

23. The fuel assembly as in claim 1, wherein the tie rod extends through a hole of the head and is slidably received in this hole.

24. The fuel assembly as in claim 1, wherein the stopping member is positioned axially along the tie rod such as to allow a limited downward stroke of the stopping member downwardly relative to the head before the stopping member abuts the abutting surface such as to prevent a further downward movement of the base relative to the head.

\* \* \* \* \*